No. 838,100. PATENTED DEC. 11, 1906.
J. R. GILBERT.
WEEDING TOOL.
APPLICATION FILED OCT. 22, 1906.
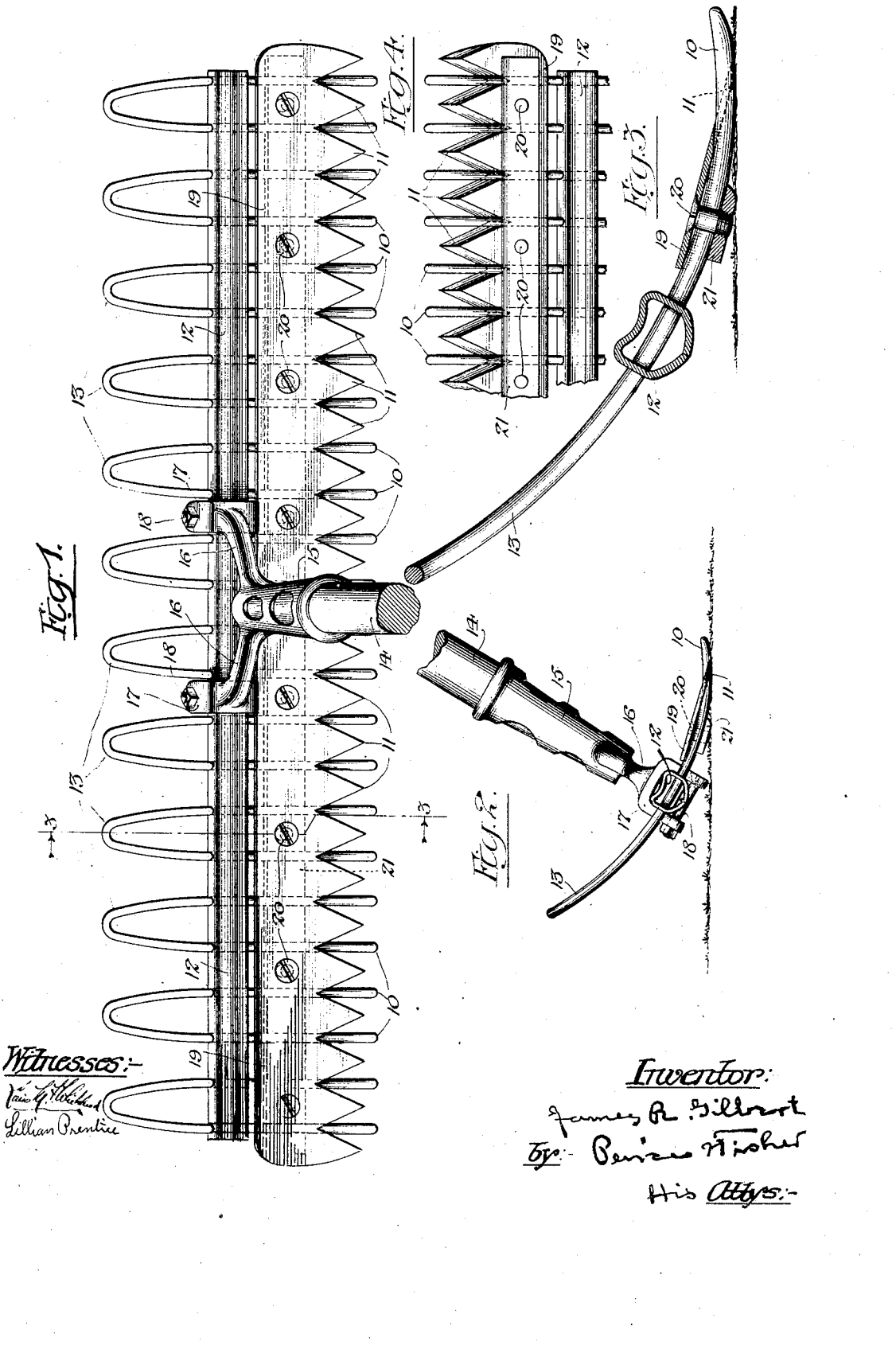

UNITED STATES PATENT OFFICE.

JAMES R. GILBERT, OF LA GRANGE, ILLINOIS.

WEEDING-TOOL.

No. 838,100.  Specification of Letters Patent.  Patented Dec. 11, 1906.

Application filed October 22, 1906. Serial No. 339,903.

*To all whom it may concern:*

Be it known that I, JAMES R. GILBERT, a citizen of the United States, and a resident of La Grange, Cook county, Illinois, have invented certain new and useful Improvements in Weeding-Tools, of which the following is declared to be a full, clear, and exact description.

The improvement relates to weeding-tools, and seeks to provide a simple and effective instrument which is particularly adapted for the easy and rapid removal of weeds from lawns and the like.

The invention consists in the features of construction, combinations, and arrangements of parts hereinafter set forth, illustrated in the accompanying drawings, and more particularly set forth in the appended claims.

In the drawings, Figure 1 is a plan view of the improved instrument with a portion only of the handle shown. Fig. 2 is a side view of the same. Fig. 3 is an enlarged detail section on the line 3 3 of Fig. 1. Fig. 4 is an inverted plan view of a portion of the instrument.

The instrument comprises a series of rake-teeth 10 and a series of beveled cutting-blades 11, arranged between the rake-teeth. The rake-teeth 10 are preferably formed of wire and are U-shaped, as shown, and centrally fixed to a head or hollow bar 12, so that the rake-head is provided on one side with the teeth 10 and on the opposite side with the blunt or rounded rake-teeth 13. The U-shaped wires forming the teeth 10 and 13 are preferably curved, so that the upper side of the set of teeth is slightly concave and the lower side slightly convex, as clearly shown in Figs. 2 and 3.

The rake-handle 14 is fixed within a metal socket 15, having a pair of outwardly-extending branches or arms 16 at its lower end. Each of these arms terminates in U-shaped clamp members 17, which sit over the rake head or bar 12 and are secured in position thereon by bolts 18, which extend through the ends of the U-shaped clamps and engage the under side of the rake head or bar 12.

The cutting-blades are beveled or pointed, as shown, and are arranged between the rake-teeth 10, which teeth extend slightly beyond the ends or points of the blades. The edges of the blades are sharpened by beveling their edges on the under side, as clearly indicated in Figs. 2 and 4. These blades are all preferably formed upon a common cutter-bar 19, which is set upon the upper or concave side of the rake-teeth 10. The cutter-bar is securely held in place by a series of screws 20, extending at intervals through the same and between the rake-teeth, and the ends of which screws are threaded into a bar 21, arranged on the under side of the rake-teeth 10 below the cutter-bar 19. The beveled heads of the screws 20 are countersunk into the cutter-bar 19, and by tightening the screws the cutter-bar 19 and holding-bar 21 are rigidly clamped upon the rake-teeth 10.

As stated, the teeth 10 are curved, while all portions of the blades 11 lie in the same plane, and since the blades are secured to the upper concave surface of the teeth they project downwardly and outwardly between the same. By reason of this construction the points of the blades will lie closely adjacent the surface of the ground when the tool is held in working position, as indicated in Figs. 2 and 3.

The tool is used somewhat in the same manner as an ordinary rake and is best employed after the lawn has been mowed. As the tool is drawn over the lawn the blades of grass will be bent down, so that the tool passes over them and so that little or no grass will be cut. The weeds on the lawn, however, having leaves will be caught between the rake-teeth and blades and will be removed. For this particular use of removing the weeds from the lawn the instrument has been found very effective in use, and a large area may be covered in a very short time.

It is obvious that numerous changes may be made in the details of construction without departure from the essentials of the invention.

Having described my invention, what I claim as new, and desire to secure by Letters Patent, is—

1. A weeder for lawns and the like comprising a series of rake-teeth and a series of cutting-blades arranged between said rake-teeth, substantially as described.

2. A weeder for lawns and the like comprising a series of rake-teeth and a series of beveled cutting-blades arranged between said rake-teeth, said teeth extending beyond the ends of said blades, substantially as described.

3. A weeder for lawns and the like comprising a series of rake-teeth, a series of beveled pointed cutting-blades, said teeth and said blades being alternately arranged and said teeth projecting beyond the points of said blades, substantially as described.

4. A weeder for lawns and the like comprising a series of curved rake-teeth and a series of straight cutting-blades secured to the upper or concave side of said teeth and projecting forwardly and downwardly between the same, substantially as described.

5. A weeder for lawns and the like comprising a series of curved rake-teeth and a series of straight cutting-blades secured to the upper or concave side of said teeth and projecting forwardly and downwardly between the same, said blades being beveled and said teeth extending beyond the ends of said blades, substantially as described.

6. A weeder for lawns and the like comprising a rake-head, a series of rake-teeth mounted thereon, a cutter-bar secured to said rake-teeth and having a series of beveled cutting-blades arranged between the same, substantially as described.

7. A weeder for lawns and the like comprising a rake-head, a series of curved rake-teeth mounted on said head, a cutter-bar secured to the upper or concave side of said rake-teeth and having a series of beveled cutting-blades extending forwardly and downwardly between said teeth, said teeth projecting slightly beyond the ends of said blades, substantially as described.

8. A weeder for lawns and the like comprising a rake-head, a handle secured thereto, a series of U-shaped wire teeth secured to said head intermediate the ends, a cutter-bar secured to the teeth on one side of said head and having a series of cutting-blades arranged between the same, substantially as described.

9. A weeder for lawns and the like comprising a rake-head, a handle secured thereto, a series of curved U-shaped wires secured to said head intermediate their ends and forming a set of blunt rake-teeth on one side and a series of sharp rake-teeth on the other side of said rake-head, a cutter-bar secured to the upper or concave side of the sharp rake-teeth and having a series of pointed blades projecting forwardly and downwardly between said teeth, substantially as described.

JAMES R. GILBERT.

Witnesses:
LILLIAN PRENTICE,
KATHARINE GERLACH.